(12) United States Patent
Dworkin et al.

(10) Patent No.: US 6,266,717 B1
(45) Date of Patent: Jul. 24, 2001

(54) SYSTEM FOR CONTROLLING DATA EXCHANGE BETWEEN A HOST DEVICE AND A PROCESSOR

(75) Inventors: James Douglas Dworkin; Michael John Torla, both of Chandler, AZ (US); Ashok Vadekar, Mississauga (CA)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/997,964

(22) Filed: Dec. 24, 1997

(30) Foreign Application Priority Data

Apr. 18, 1997 (GB) .................................................. 9707861

(51) Int. Cl.$^7$ ............................. G06F 13/14; G06F 13/20
(52) U.S. Cl. ................................ 710/51; 710/36; 710/52; 710/65; 710/66
(58) Field of Search .................................. 710/1, 51, 36, 710/52, 65, 66

(56) References Cited

U.S. PATENT DOCUMENTS

| | | | |
|---|---|---|---|
| 5,235,614 | * 8/1993 | Bruckert et al. | ............................. 375/1 |
| 5,577,069 | * 11/1996 | Lau et al. | ............................. 375/242 |
| 5,627,855 | * 5/1997 | Davidovici | ............................. 375/207 |
| 5,638,069 | * 6/1997 | Rensink et al. | ......................... 341/67 |
| 5,859,875 | * 1/1999 | Kato et al. | ............................. 375/267 |

* cited by examiner

Primary Examiner—Thomas C. Lee
Assistant Examiner—Rehana Perveen
(74) Attorney, Agent, or Firm—Gregg Rasor; Philip P. Macnak

(57) ABSTRACT

A system for efficiently controlling the exchange of data between a host bus (190) and an input/output (I/O) register (125) of an elliptic curve (EC) processor (120) having a much wider datapath than that of the host device (100). A spreading/despreading pattern is determined which spans multiple bit positions of the input/output register (125). In one embodiment, a full combinational circuit (300) is provided to connect a bit position of the host bus (190) to a bit position of the input/output register (125). In another embodiment, a combinational circuit (300) and an intermediate register (410) are provided. In still another embodiment, a spreading-by shifting system (500) is provided which comprises a plurality of subfield modules (520) into which data from the host bus (190) is shifted. The spreading/despreading pattern is achieved through multiplexers (540) connected between the subfield modules (520). In yet another embodiment, a cross bar switch (600) is provided to connect any bit position of the host bus (190) to any bit position of the I/O register 125. In each embodiment, an EC control unit (123) is provided which stores information for the spreading/despreading pattern.

21 Claims, 9 Drawing Sheets

SYSTEM FOR CONTROLLING DATA EXCHANGE BETWEEN A HOST DEVICE AND A PROCESSOR

FIELD OF THE INVENTION

The present invention is directed to wireless communication technology where secure communication is achieved using elliptic curve cryptographic techniques, and more particularly to an input/output interface circuit to coordinate the exchange of data between a host processor and an elliptic curve processor.

BACKGROUND OF THE INVENTION

Secure communication of information provided by encryption techniques is desirable in wireless communication devices, such as pagers, cellular telephones, etc. In these environments, there is a need to minimize the amount of information transmitted to control costs and profitability of systems. When the data to be transmitted is encrypted, it is still desirable to minimize the overall amount of data actually transmitted.

Elliptic curve (EC) cryptography has become particularly useful in the field of wireless communication because it is more efficient both in terms of bandwidth and computation time than other industry public key encryption standards, such as RSA. An EC processor is used to perform the finite field arithmetic operations associated with EC cryptography. The EC processor exchanges encrypted data to be decrypted, and vica versa, with a host device; such as a wireless communication device. The width of the datapath of the EC processor is preferably much greater than the width of the host bus of the host device, in order for the EC processor to be versatile in use.

Accordingly, a system is needed to efficiently manage the exchange of data between the host bus of a host device and an EC processor, particularly when data in the host device and in the EC processor is most efficiently organized and stored in different bit patterns.

DESCRIPTION OF A PREFERRED EMBODIMENT

Figure 1:
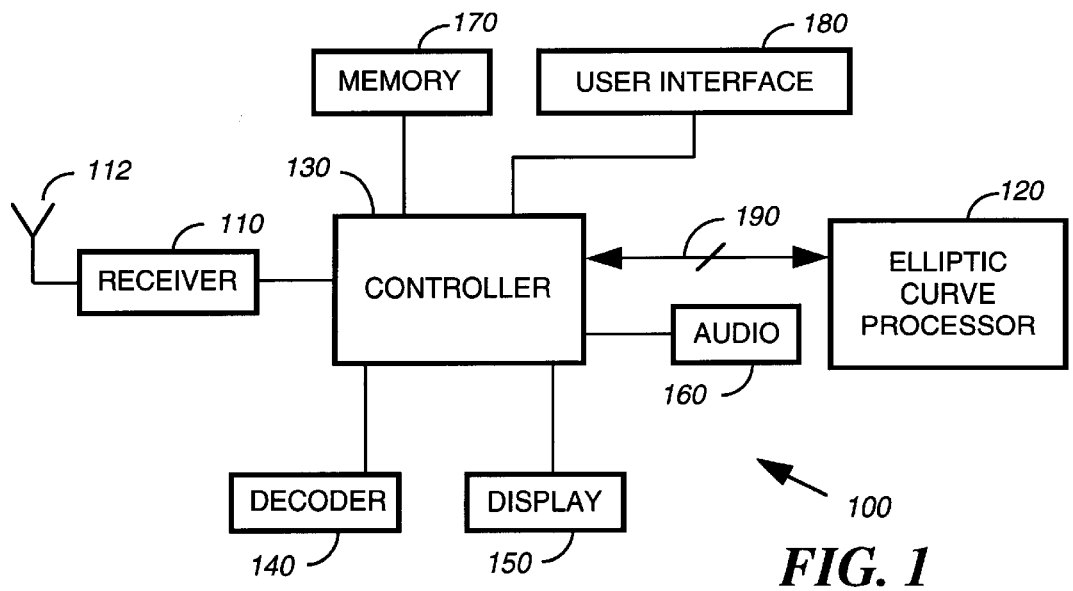
FIG. 1 is a block diagram of a communication device suitable for receiving and processing elliptic curve data in accordance with the present invention.

FIG. 1 illustrates a communication device 100 comprising, of most importance to the present invention, a receiver 110, an elliptic curve (EC) processor 120 and a controller 130. Information transmitted by way of radio frequency (RF) signals are detected by the antenna 112 and received by the receiver 110. In the case where the communication device is a selective call receiver (pager), the information is processed by a decoder 140 in accordance with protocol rules and definitions, such as those set by the FLEX™ paging protocol technology developed by Motorola, Inc. The controller 130 processes the received information for display on a display device 150 or if the received information is voice information, causes playback of the voice information on an audio output device 160. The controller 130 accesses information in memory 170 to, for example, compare a received paging address with a stored address. Received message information is also stored in the memory 170. User access and control of the communication device are by way of user interface 180. The controller 130 is embodied by a microprocessor, for example. The controller 130 is hereinafter referred to as the "host" and communication device 100 is referred to as a "host device". The controller 130 of the communication device 100 is a host to the elliptic curve processor in that it supplies data to the EC processor 120 to be processed and receives back processed data.

In the case where information received by the communication device 100 includes elliptic curve point information embedded in the received RF signals, the received information is coupled by the controller 130 to the EC processor 120. The EC processor 120 is shown in more detail in FIG. 2. The EC processor 120 is a circuit that processes EC points embedded in the received information in order to decrypt the EC points and generate the corresponding data or message. The EC processor 120 comprises a finite field (FF) arithmetic logic unit (ALU) 122, an EC control unit 123, operation registers 124, an input/output (I/O) register 125, and a register file 127. The finite field ALU 122 has inputs for receiving first and second operands from a first operations bus 128 and a second operations bus 129, respectively. The result of a finite field operation is returned on the result bus 126. Data to be processed by the EC processor 120 is received from the host bus 190 via the I/O register 125 and processed data is returned via the I/O register 125. The operation buses 128 and 129 and the result bus 126 are of the same bit width as the computation capability (also referred to as the datapath width) of the FF ALU 122. For example, the FF ALU 122 may have a 246 bit parallel processing capability. Instructions for controlling the operation of the EC processor 120 are stored in a read only memory (ROM) internal to the EC control unit 123.

Figure 3:
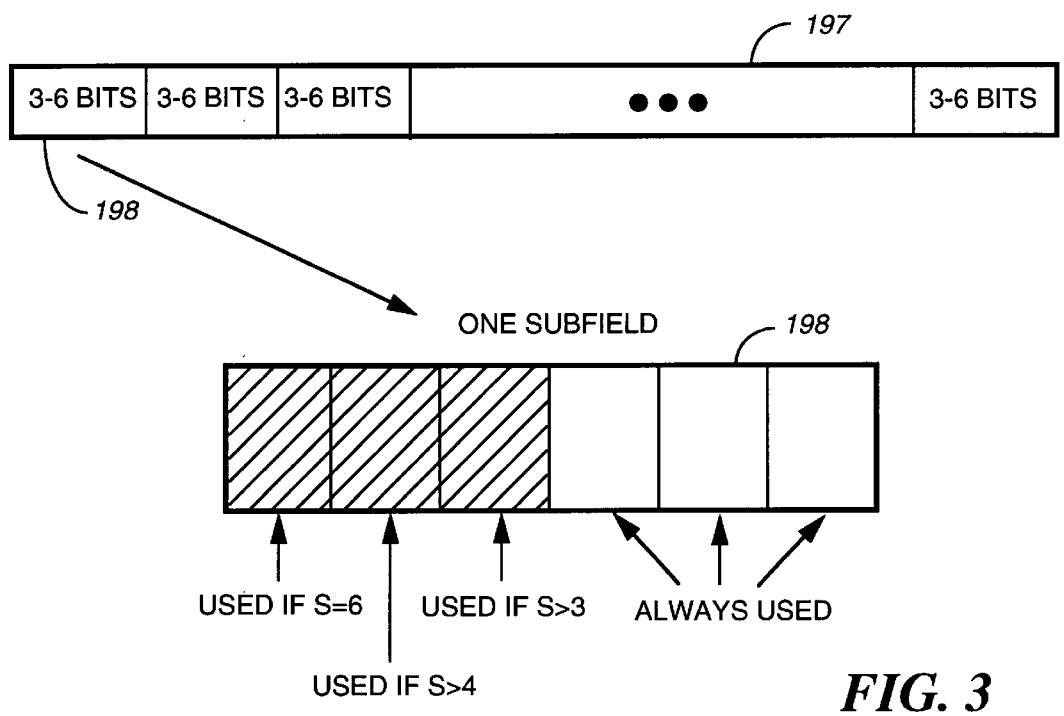
FIG. 3 is a diagram showing the organization of a plurality of bits representing a finite field element to be processed by the elliptic curve processor according to the present invention.

FIG. 3 illustrates an organization of a plurality of bits 197 used to represent a finite field element to be processed by the EC processor 120. The plurality of bits are organized into variable size subfields 198, wherein each subfield 198 comprises a smaller plurality of bits ranging from a minimum number to a maximum number. For example, in FIG. 3, each subfield has a minimum of 3 bits and a maximum of 6 bits. The number of bits or size of a subfield affects the overall size of the finite field (set of numbers) over which encryption/decryption is performed. Thus, by organizing the plurality of bits that are used to represent a finite field element into subfields of variable size, the "strength" of the encryption/decryption is controllable. Data supplied to the EC processor 120 must be properly mapped when written into the subfield organization of the I/O register 125. This variable size subfield organization optimizes the processing performance of the EC processor 120.

Several terms will be used hereinafter:

N means the bit width of the host bus.

$S_{max}$ means the maximum subfield processing size supported by the EC processor.

$S_{min}$ means the minimum subfield processing size supported by the EC processor.

E means the number of subfields (extension field size) supported by the EC processor.

In general, the width of the datapath of the EC processor 120, and thus the width of the I/O register 125, is $E \times S_{max}$. For example, an EC processor 120 that has an 41 subfields, a minimum subfield processing size of 3 and a maximum subfield processing size of 6 has an I/O register 125 which is 246 bits wide. In general, the width of the datapath and thus the I/O register 125 is M bits, where $M = E \times S_{max}$.

When the host writes to the I/O register 125, it writes 8, 16 or 32 bits at a time, and distributes bits throughout the I/O register 125 depending on the subfield processing size (called "S" in FIG. 3) desired for a particular processing event. Some bit positions of the I/O register 125 will be ignored, called "unused locations", when the content of the I/O register 125 is read to an internal register of the EC processor 120. The unused bit locations can get in the way as the host writes to the I/O register 125. To avoid writing valid data to the unused bit locations, the host must take 8, 16 or 32 bits of data and spread them out into more than (8, 16 or 32) bit locations. The manner in which data is exchanged between the host bus 190 and the I/O register 125 depends on the minimum and maximum subfield processing sizes of the EC processor 120, the desired subfield processing size called upon at a particular processing event by the EC processor, and a width of the host bus. This process is tedious to perform in software and represents a significant performance penalty in terms of use of the host processing power and time.

Figure 4:
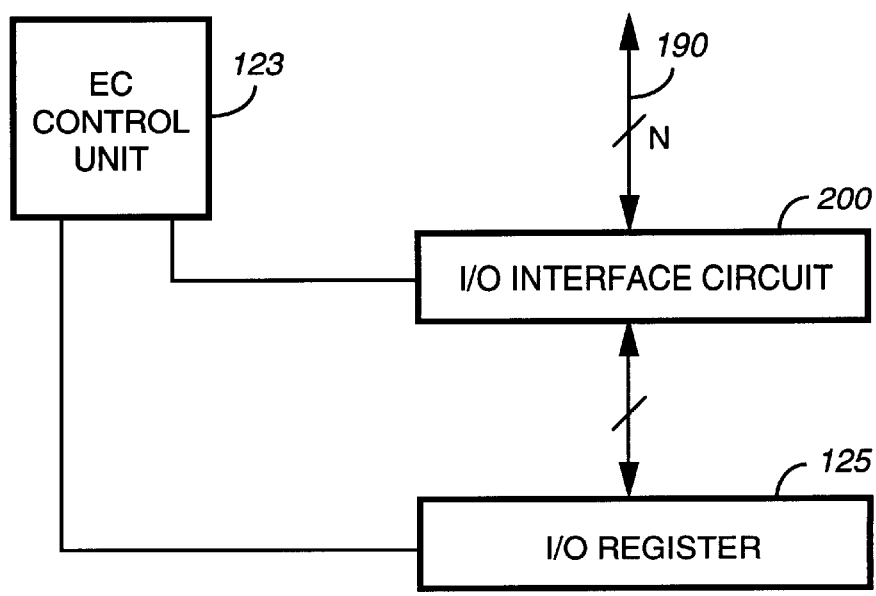
FIG. 4 is a block diagram generally showing an interface system comprising an input/output interface circuit for connection to an input/output register of an elliptic curve processor, according to the present invention.

Referring to FIG. 4, the present invention is directed to an I/O interface system comprising an I/O interface circuit shown generally at reference numeral 200 and the EC control unit 123 which controls the I/O interface circuit 200 to spread/despread data exchanged between the register I/O register 125 and the host bus 190. To write to the I/O register 125, the I/O interface circuit 200 writes data from the host bus 190 to the input/output register 125 and spreads the data in the I/O register 125 for unused bit positions in subfields determined for the desired subfield processing size. That is, the EC control unit 123 controls the I/O interface circuit 200 to spread bits of a host bus word from the host bus 190 to bit positions of the I/O register 125 such that bit positions of the I/O register 125 corresponding to a subfield contain as many bits of a host bus word as the subfield processing size of the processing circuit. The remaining bits of a host bus word are written into the bit positions of the I/O register 125 corresponding to a next subfield.

To read data from the I/O register 125 to the host bus 190, the I/O interface circuit 200 despreads the data as it is read to the host bus 190. The EC control unit 123 controls the I/O interface circuit 200 to despread bits of the I/O register 125 when reading data to the host bus 190 to reconstruct host bus words from bits in the I/O register 125 according to the subfield processing size of the EC processor. The EC control unit 123 is connected to the I/O interface circuit 200 and controls the exchange of data between the I/O register 125 and the host bus 190 according to a spreading/despreading pattern. Once the range of subfield processing size($S_{min}$ to $S_{max}$) of the EC processor 120 is set (at design of the EC processor 120) and the width of the host bus 190 is determined, the spreading/despreading pattern is determined based on the subfield processing size used the EC processor 120 for a particular processing event.

The host bus width is usually fixed for a particular hardware/host device, whereas the subfield processing size used by the EC processor varies between $S_{min}$ and $S_{max}$ for a particular processing event or events, under control of the EC control unit 123. Thus, the control information stored in the EC control unit 123 which is used to perform the spreading/despreading pattern is based primarily on the connections that need to be made between bit positions of the host bus 190 and bit positions of the I/O register 125 for a particular subfield processing size of the EC processor 120. This control information also accounts for the host bus width N.

For example if the maximum subfield processing size is 8 bits wide and the subfield processing size for a particular processing event is 6, then the least significant 6 bit positions will be used and the two most significant bit positions will not be used. Likewise, when the host reads data from the I/O register 125, the host reads 8, 16 or 32 bits at a time and the I/O interface circuit 200 automatically despreads the data so that the unused bit locations are never read. The EC control unit 123 stores spreading/despreading pattern information in a read-only-memory (ROM) which controls how the data is spread when writing to the I/O register 125 and how data is despread when reading data from the I/O register 125 to the host bus 190.

It is desirable to perform the spreading function by hardware because less processing power is required for a hardware solution than for a software solution. In addition, implementing the spreading/despreading function in software provides greater to exposure to a potential security breach. Moreover, it is cumbersome for most microprocessors to manipulate bits in this manner. Nevertheless, the spreading/despreading function needs to be programmable to accommodate the variable subfield size processing capability of the EC processor.

In accordance with the present invention, the I/O interface circuit 200 can take on one of several forms shown in FIGS. 5–10.

Figure 5:
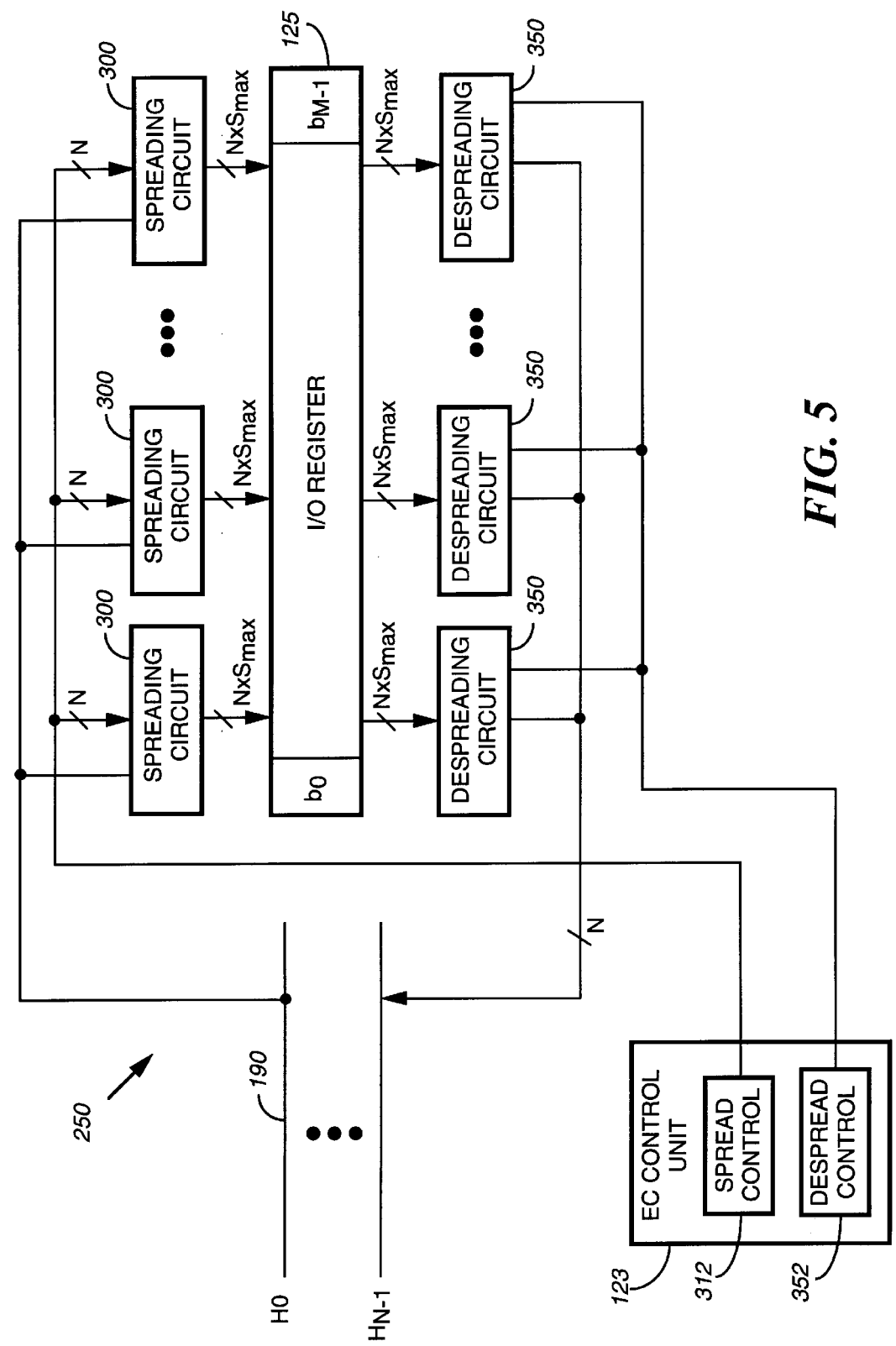
FIG. 5 is a block diagram of a combinational spreading/despreading system according to a first embodiment of the present invention.
Figure 6:
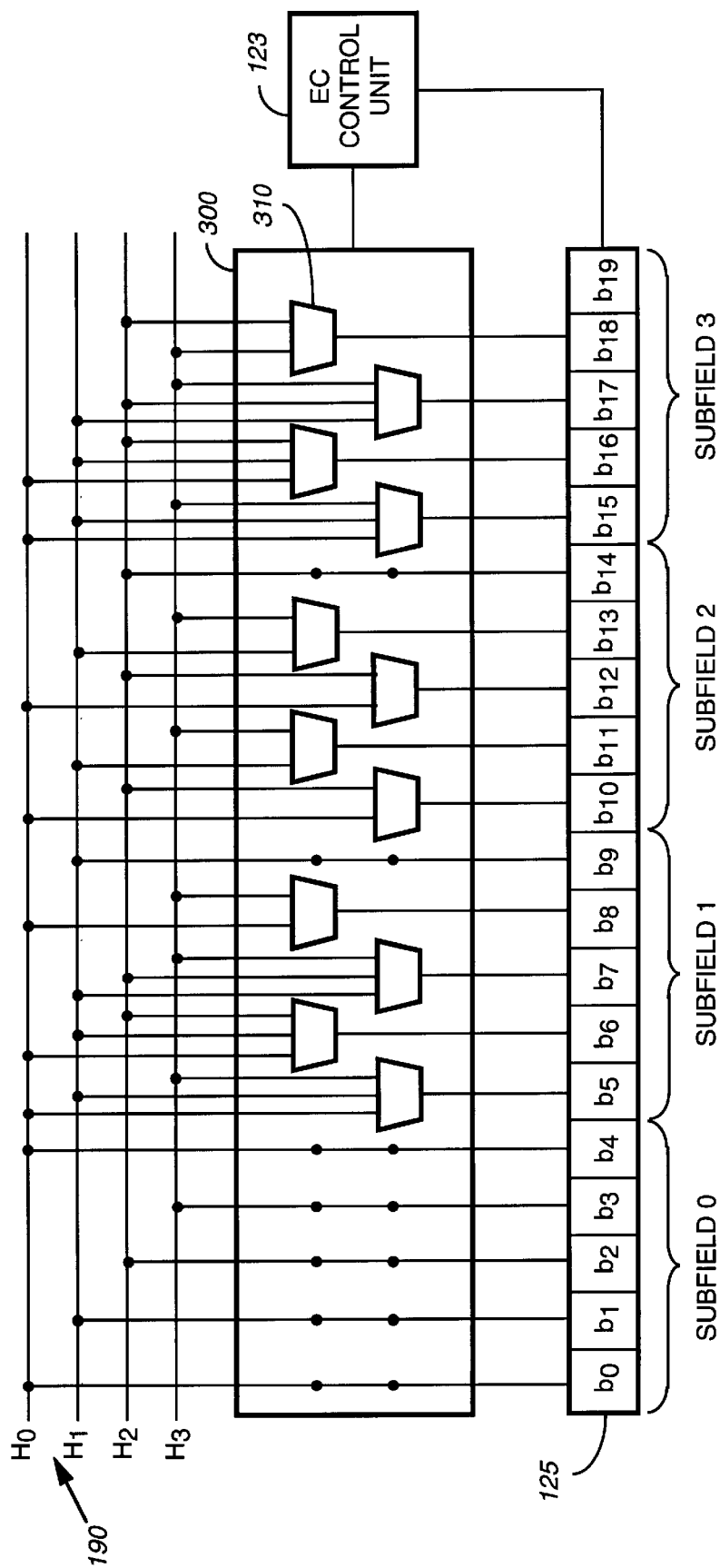
FIG. 6 is a block diagram of a spreader circuit forming a part of the combinational spreading/despreading system according to the first embodiment.
Figure 7:
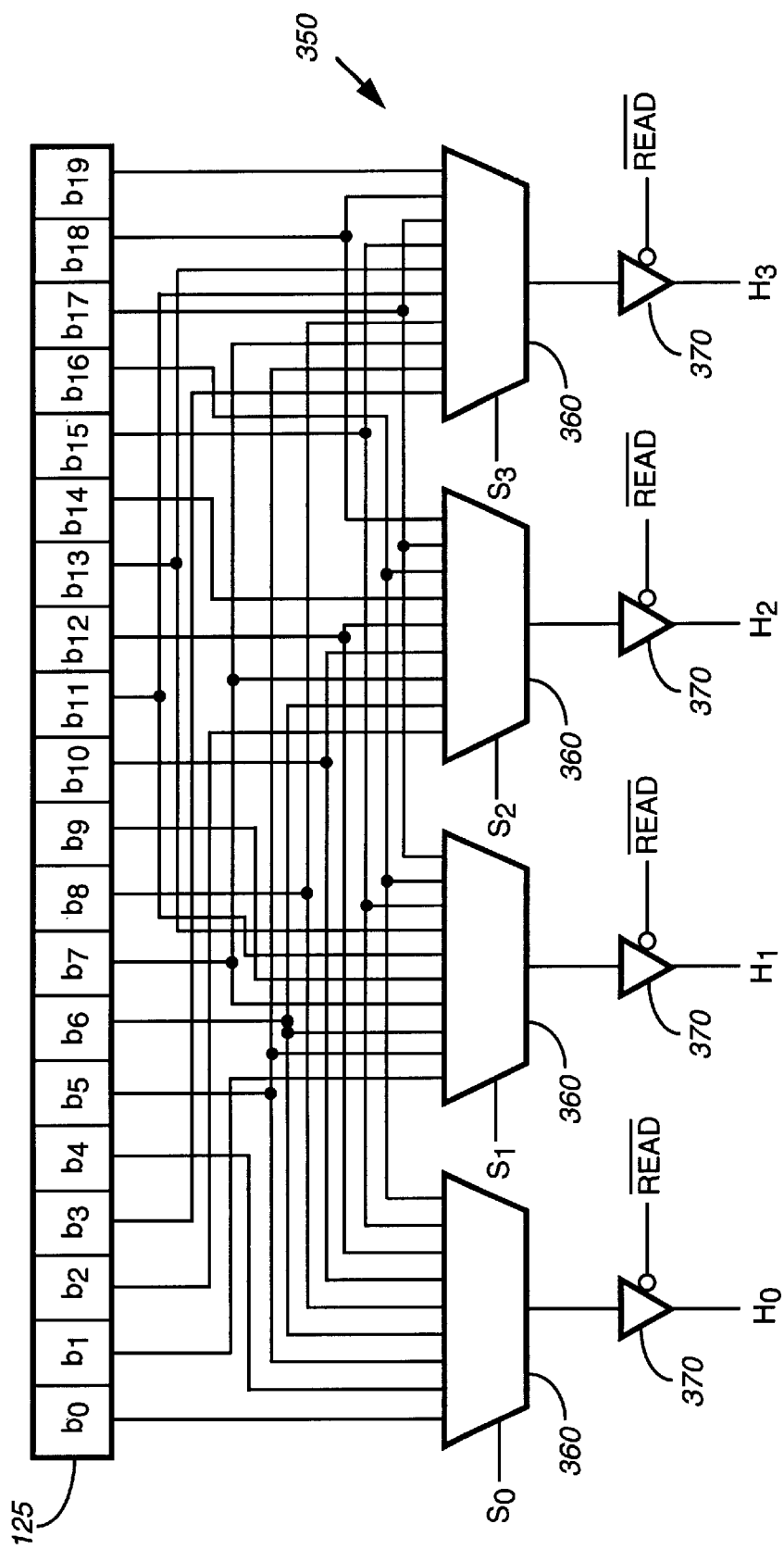
FIG. 7 is a block diagram of a despreader circuit forming a part of the combinational spreading/despreading system according to the first embodiment.

Referring to FIGS. 5–7, a combinational spreading/despreading system 250, according to a first embodiment of the present invention will be described. The system 250 comprises a plurality of spreading circuits 300 each of which connects to the host bus 190 and to the I/O register 125 to write data from the host bus 190 to the I/O register 125, and a plurality of despreading circuits 350, each of which reads data from the I/O register 125 onto the host bus 190. Each spreading circuit 300 is identical in function and control. The same is true for each despreading circuit 350. The number of spreading circuits 300 and despreading circuits 350 depends on the width of the I/O register 125. In general, the basic spreading pattern repeats every $N \times S_{max}$ bits of the I/O register 125. After N×S$_{max}$ bits, the same spreading circuit 300 is duplicated a number of times to write data from the host bus 190 to more significant portions of the I/O register 125 until the I/O register 125 is spanned. Consequently, each spreading circuit 300 handles writing to N×S$_{max}$ bit positions of the I/O register 125, whereby N bits of the host bus 190 are spread throughout N×S$_{max}$ bit positions of the I/O register 125. Each despreading circuit 350 handles reading N×S$_{max}$ bit positions from the I/O register 125 to despread those bits as they are read to N bit positions of the host bus 190. The spreading pattern for each spreading circuit 300 is the same, and the despreading pattern for each despreading circuit 350 is also the same.

The spreading circuit 300 shown in FIG. 6 is for a interfacing a 4-bit host bus 190 (H$_0$, H$_1$, H$_2$ and H$_3$) with an EC processor having a subfield size processing range of 3 to 5, where S$_{min}$=3 and S$_{max}$=5. A 4-bit host bus example is shown for explanatory purposes, while it is understood by those with ordinary skill in the art that the typical host bus width is 8, 16 or 32 bits.

Each bit position of the host bus 190 is connected to select bit positions of the I/O register 125 depending on the desired subfield processing size invoked by the EC processor 120. For this example, the connections between the bit positions of the host bus 190 and the bit positions of the I/O register 125 are shown in the following table.

| Subfield Processing Size | Bit Positions of I/O Register | | | | | | | | | | | | | | | | | | | |
|---|---|---|---|---|---|---|---|---|---|---|---|---|---|---|---|---|---|---|---|---|
| | b$_0$ | b$_1$ | b$_2$ | b$_3$ | b$_4$ | b$_5$ | b$_6$ | b$_7$ | b$_8$ | b$_9$ | b$_{10}$ | b$_{11}$ | b$_{12}$ | b$_{13}$ | b$_{14}$ | b$_{15}$ | b$_{16}$ | b$_{17}$ | b$_{18}$ | b$_{19}$ |
| 3 | H$_0$ | H$_1$ | H$_2$ | — | — | H$_3$ | H$_0$ | H$_1$ | — | — | H$_2$ | H$_3$ | H$_0$ | — | — | H$_1$ | H$_2$ | H$_3$ | — | — |
| 4 | H$_0$ | H$_1$ | H$_2$ | H$_3$ | — | H$_0$ | H$_1$ | H$_2$ | H$_3$ | — | H$_0$ | H$_1$ | H$_2$ | H$_3$ | — | H$_0$ | H$_1$ | H$_2$ | H$_3$ | — |
| 5 | H$_0$ | H$_1$ | H$_2$ | H$_3$ | H$_0$ | H$_1$ | H$_2$ | H$_3$ | H$_0$ | H$_1$ | H$_2$ | H$_3$ | H$_0$ | H$_1$ | H$_2$ | H$_3$ | H$_0$ | H$_1$ | H$_2$ | H$_3$ |

As an example, if a maximum subfield processing size of the EC processor 120 is 5 and the number of subfields E supported by the EC processor is 40, the width of the datapath and thus the I/O register 125 of the EC processor is 200 bits. If the width of the host bus is 4 bits, then each spreading circuit 300 will span 10 bit positions of the I/O register 125, contiguous with an adjacent spreading circuit 300. Similarly, each despreading circuit 350 will span 10 bit positions of the I/O register 125, contiguous with an adjacent despreading circuit 350. Consequently, there are 20 spreading circuits 300 to write to the I/O register 125 and 20 despreading circuits 350 to read from the I/O register 125. Each spreading circuit 300 and despreading circuit 350 comprises a block of combinational logic that connects each bit position of the host bus 190 to appropriate bit positions of the I/O register 125. The EC control unit 123 is connected to each of the spreading circuits 300 and controls each spreading circuit 300 based on spread control information 312 stored therein. Similarly, the EC control unit 123 is connected to each of the despreading circuits 350 and controls each despreading circuit 350 based on despread control information 352 stored therein.

Turning to FIG. 6, one spreading circuit 300 is shown for an example where the width of the host bus 190 is 4 bits, the maximum subfield processing size S$_{max}$ is 5, the minimum subfield processing size S$_{min}$ is 4, and the number of subfields E is 40, for example. The spreading circuit 300 comprises a plurality of multiplexers 310. Each multiplexer 310 comprises a plurality of inputs connected to select bit positions of the host bus 190 and an output connected to a bit position of the I/O register. The spread control information stored EC control unit 123 consists of multiplexer selection control data used to control which bit position is selected for output by each multiplexer 310 to a bit position of the I/O register 125, depending on the desired subfield processing size to be used by the EC processor 120. The number of inputs of each multiplexer 310 and the bit positions of the host bus 190 and I/O register 125 to which its inputs and output connect is determined upon design of the EC processor 120, and is fixed for a known range of subfield size processing capabilities (S$_{max}$ and S$_{min}$) and the width N of the host bus 190.

FIG. 6 shows the connections between the bit positions of the host bus 190 and a the N×S$_{max}$ bit positions of the I/O register 125 required for this example. It is evident that no multiplexers are needed until bit position b$_5$ of the I/O register 125 in this example. At bit position b$_5$, the three inputs to the multiplexer 310 are connected to bit positions H0, H1 and H3. Similarly, at bit position b$_6$, the inputs to the multiplexer 310 are connected to bit positions H$_0$, H$_1$ and H$_2$. The table shows the bit positions that need to be connected to a multiplexer (two bit positions at a minimum and three at a maximum) for the appropriate bit positions of the I/O register 125 to accommodate the three possible subfield processing sizes (3, 4 and 5). Depending on the subfield processing size, the multiplexers 310 are controlled to select the proper input for output to the I/O register 125. For example, at bit position b$_5$, when the desired subfield processing size is 4, then the multiplexer selects bit position H$_0$ for connection to the I/O register 125 so that the content of bit position H$_0$ is coupled to bit position b$_5$ of the I/O register 125.

When the desired subfield processing size is 3, the content at bit positions b$_3$ and b$_4$ of the I/O register 125 does not matter because the EC processor will ignore those bits. The same is true at bit position b$_4$ when the desired subfield processing size is 4. Therefore, since the content of these bit positions is ignored, then the corresponding bit position of the host bus is simply connected to those bit positions of the I/O register 125. The content of bit positions b$_3$ and b$_4$ is used for subfield processing size 5, in which case the content of the appropriate bit position of the host bus 190 is already connected.

The spreading control information 312 consists, for example, of a spreading control word comprising a plurality of control bits sufficient to select one of the plurality of inputs of each multiplexer 310, depending on the pattern of control bits, for output to the associated bit position of the I/O register 125. In operation, host bus words on the host bus 190 are written through the spreading circuits 300 into the I/O register 125. The content of the I/O register 125 is then written to a register in the EC processor 120. Each spreading circuit spreads data for several host bus words, depending on the range of subfield processing sizes and host bus width.

The EC control unit 123 addresses the proper spreading circuit 300 for each host bus word to be written to the I/O register 125. For example, a spreading circuit 300 associated with a least significant predetermined number of bits positions ($N \times S_{max}$) of the I/O register 125, can handle three host bus words (for a particular subfield processing size), the next significant spreading circuit 300 handles the next three host bus words, and so on. This writing process cycles through each spreading circuit 300 for each group of $N \times S_{max}$ bit positions of the I/O register 125 until the I/O register 125 is full.

FIG. 7 shows one despreading circuit 350 for the same configuration example shown in FIG. 6. The despreading circuit 350 comprises a plurality of multiplexers 360 for each bit position of the host bus 190. Each multiplexer 360 has a plurality of inputs connected to select bit positions of the I/O register 125. A tri-state buffer circuit 370 is connected at the output of each multiplexer 360. Each multiplexer 360 is connected to those bit positions of the ($N \times S_{max}$) portion of the I/O register 125 which potentially contain a bit that should be connected to a corresponding bit position of the host bus 190. For example, referring to the table above, bit positions $b_0$, $b_4$, $b_5$, $b_6$, $b_8$, $b_{10}$, $bl_{12}$, $bl_{15}$ and $b_{16}$ of the I/O register 125 each potentially contains a bit that should be connected to the host bus bit position $H_0$, depending on the subfield processing size invoked by the EC processor. Consequently, the inputs of the multiplexer 160 for bit position $H_0$ must be connected to those bit positions of the I/O register 125. Each multiplexer 360 has similar input connections to accommodate the subfield processing size capability of the EC processor 120.

The tri-state buffer circuits 370 drive the corresponding bit position of the host bus 190 with the output of the multiplexer when a read signal is low (active), and when the read signal is high (inactive) a high impedance is established between each bit position of the host bus 190 and the tri-state buffer, so as avoid host bus conflicts.

When data from the 110 register 125 is to be read onto the host bus 190, the I/O register 125 will contain data corresponding to multiple host bus words. It takes several read cycles to transfer the content of the I/O register 125 to the host bus 190. For example, with reference to FIG. 7, and the table above, the content of each $N \times S_{max}$ bit positions of the I/O register will contain a number of host bus words, depending on the subfield processing size. If the subfield processing size is 3, then bit positions $b_0$, $b_1$, $b_2$ and $b_5$ will contain the bits for one host bus word, bit positions $b_6$, $b_7$, $b_{10}$ and $b_{11}$ will contain bit the bits for another host bus word, and bit positions $b_{12}$, $b_{15}$, $b_{16}$ and $b_{17}$ will contain bits for yet another host bus word. Thus, three host bus words would be contained in one $N \times S_{max}$ portion of the 110 register 125.

As a result, data from the I/O register 125 must be read in cycles, whereby data for one host bus word is read to the host bus, then the host device transfers that data word to memory and can accept a new host bus word. Accordingly, for the example of subfield processing size 3, three cycles are required to transfer the data from one $N \times S_{max}$ portion of the I/O register 125. The EC control unit 123 generates a despreading control signal based on the despreading control data synchronized to the read signal, so that the appropriate input of the multiplexer 360 is selected at the appropriate read cycle. For example, each multiplexer 360 shown in FIG. 7 is controlled by a respective one of the selection control signals $S_0$, $S_1$, $S_2$ and $S_3$. These selection control signals are generated based on the subfield processing size. When the subfield processing size is 3, for example, in the first read cycle, selection control signal $S_0$ selects bit position $B_0$, $S_1$ selects bit position $b_1$, $S_2$ selects bit position $b_2$ and $S_3$ selects bit position $b_5$. In the next read cycle, $S_0$ selects bit position $b_6$, $S_1$ selects bit position $b_7$, $S_2$ selects bit position $b_{10}$ and $S_3$ selects bit position $b_{11}$. In the last read cycle for one $N \times S_{max}$ portion of the I/O register, $S_0$ selects bit position $b_{12}$, $S_1$ selects bit position $b_{15}$, $S_2$ selects bit position $b_{16}$ and $S_3$ selects bit position $b_{17}$.

Figure 8:
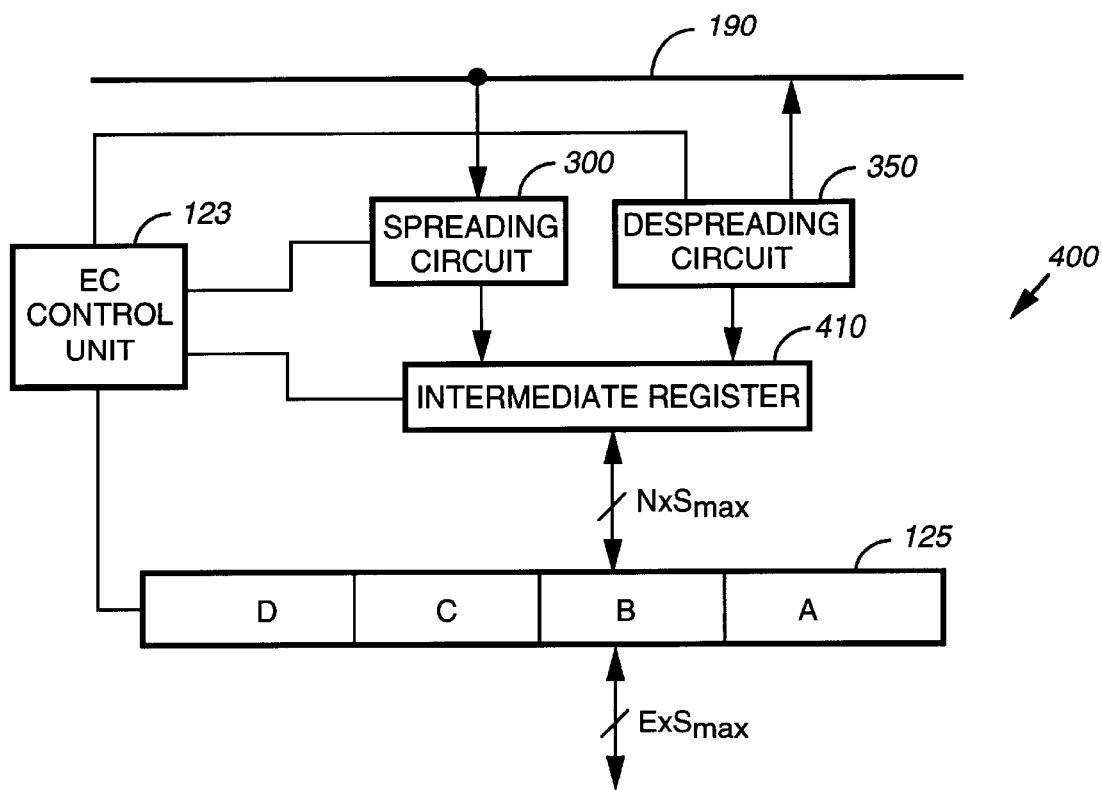
FIG. 8 is a block diagram of an intermediate register spreading/despreading system according to second embodiment of the present invention.

FIG. 8 illustrates an intermediate register spreading/despreading system 400. The intermediate register spreading/despreading system 400 comprises an intermediate register 410, a spreading circuit 300 and a despreading circuit 350. The spreading circuit 300 and the despreading circuit 350 are similar to those shown in FIG. 5, and each spans one iteration of the spreading/despreading pattern equal to $N \times S_{max}$ bits. The spreading circuit 300 comprises a plurality of multiplexers as shown in FIG. 6, and the despreading circuit 350 comprises a plurality of multiplexers as shown in FIG. 7. The intermediate register 410 connects between the I/O register 125 and the spreading circuit 300, on the one hand, and the despreading circuit 350, on the other. The system 400 exploits the fact that the basic spreading/despreading pattern repeats after $N \times S_{max}$ bits of the I/O register 125. The intermediate register 410 is $N \times S_{max}$ bits wide. The EC control unit 123 stores spreading/despreading pattern information similar to that used in the system of FIG. 5.

To write data from the host bus 190 to the I/O register 125, the EC control unit 123 controls the multiplexers in the spreading circuit 300 to connect bit positions of the host bus 190 to appropriate bit positions of the intermediate register 410 according to the spreading control information. One host bus word from the host bus 190 is coupled to the spreading circuit 300, which spreads the bits of the host bus word through $N \times S_{max}$ bit positions according to the subfield processing size invoked by the EC processor. Then, the EC control unit 123 causes the $N \times S_{max}$ bits of data (with unfilled bit positions spread accordingly) to be written to a least significant $N \times S_{max}$ bit positions of the I/O register 125, such as portion A shown in FIG. 8. The next host bus word from the host bus 190 is coupled to the spreading circuit 300, which spreads the bits through $N \times S_{max}$ bit positions. The EC control unit 123 then causes the content of the intermediate register 410 to be written to a next more significant $N \times S_{max}$ bit positions of the I/O register 125, which corresponds to portion B of the I/O register, for example. This process is repeated until the I/O register 125 spanned, through portions C and D, for example.

To read data from the I/O register 125 to the host bus 190, the EC control unit 123 causes the content from the least significant $N \times S_{max}$ bit positions of the I/O register 125, such as portion A, to be loaded into the intermediate register 410. The EC control unit 123 then causes the $N \times S_{max}$ bits to be coupled through the despreading circuit 350, which through several read cycles, couples several host bus words contained in $N \times S_{max}$ bits of data, onto the host bus. Then, the EC control unit repeats this process for the remaining $N \times S_{max}$ portions of the I/O register 125, such as portions B, C and D.

Figure 9:
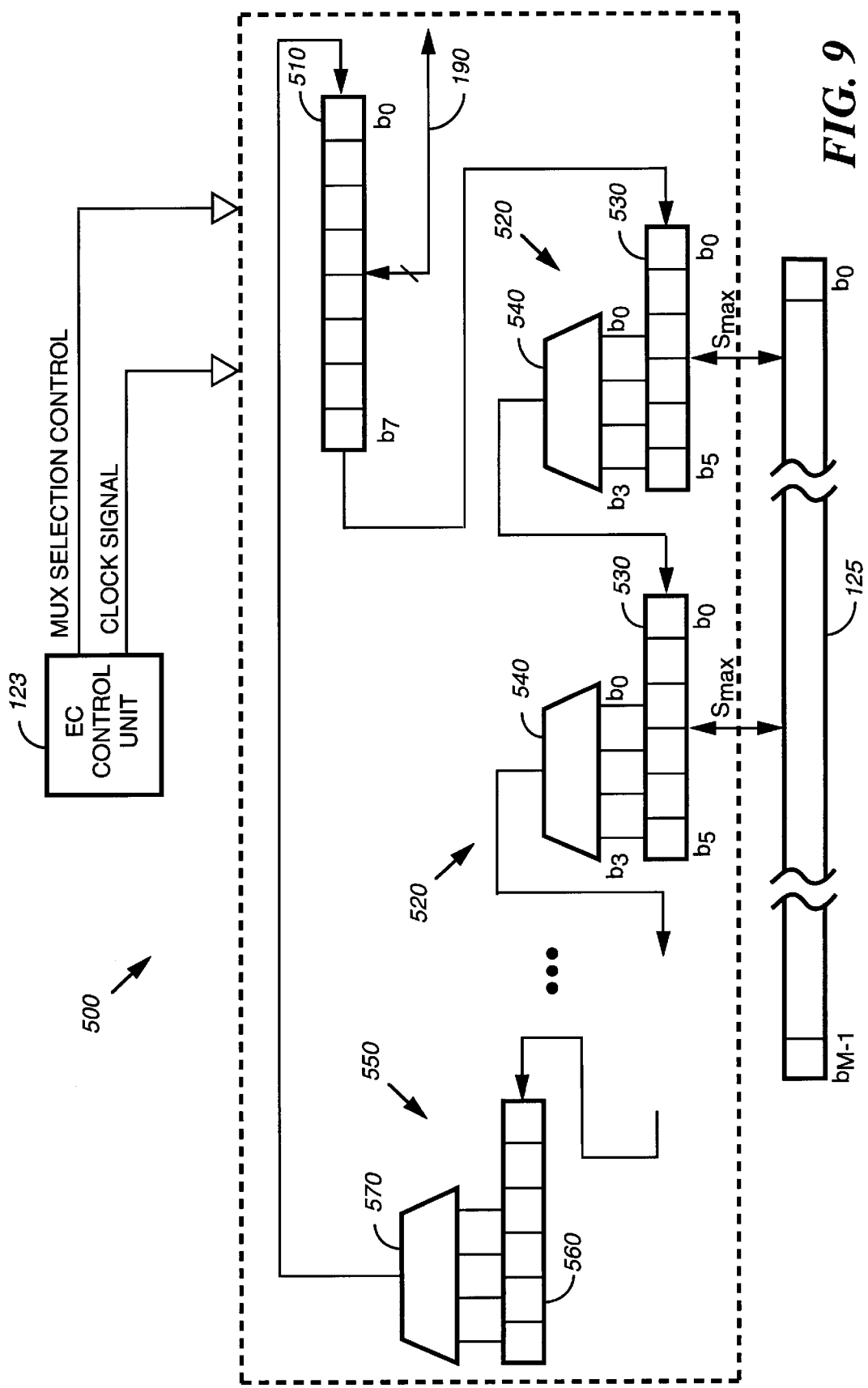
FIG. 9 is a block diagram of a spreading-by-shifting system according to a third embodiment of the present invention.

FIG. 9 illustrates a spreading-by-shifting system 500 according to a third embodiment of the present invention. The spreading-by-shifting circuit 500 comprises a loading register 510 connected to the host bus 190 that receives data in parallel, according to the width of the host bus 190, and clocks data out serially. Connected to the loading register 510 is a subfield module 520 comprising a subfield register 530 and a multiplexer 540 connected to the subfield register 530. The width of the subfield register 530 is equal to the largest subfield size supported by the EC processor ($S_{max}$), and for example comprises bit positions $b_0$ through $b_5$ for $S_{max}=6$. Each multiplexer 540 has a plurality of inputs sufficient to connect to bit position $b_{Smin-1}$ through bit position $b_{Smax-1}$ of the associated subfield register. For example, if $S_{max}=6$ and $S_{min}=3$, each multiplexer 540 connects to bit positions $b_2$ through $b_5$ of the associated subfield register 530. Which bit position of the subfield register 530 is selected for output by the multiplexer 540 depends on the subfield processing size of the EC processor 120, controlled by the EC control unit 123, as will be explained hereinafter.

The output of the multiplexer 540 is connected as the serial input to the subfield register 530 of the next most significant subfield module 520. The subfield registers 530 are serial-in parallel-out registers that are connected to the I/O register. The subfield register 530 of the subfield module 520 closest to the host bus 190 is the least significant subfield module. It receives data shifted serially out of the loading register 510 and is connected to the least significant bits of the I/O register. It is in turn connected through its multiplexer 540 to the next more significant subfield module to the left of it. This pattern is repeated to span the I/O register 125. Thus, there are a predetermined number of subfield modules 520 equal to the number of subfields supported by the EC processor in order to write to the I/O register 125. In addition, a fix-up module 550 is provided comprising a fix-up register 560 and a multiplexer 570, similar to the subfield register 530 and multiplexer 540 of the subfield modules 520. The fix-up register 560 of the fix-up module is connected to the output of the multiplexer 540 for the most significant subfield module. The multiplexer 570 is connected to the fix-up register 560 in the same manner as the multiplexer 540 connects to its associated subfield register in the subfield modules 520.

The EC control unit 123 is connected to each multiplexer 540 in each subfield module 520 and also to the multiplexer 570 in the fix-up module 550. The loading register 510, shift registers 530 and fix-up register 560 are shifted in response to a clock signal supplied by the EC control unit 123.

When writing data to the I/O register 125, a data word from the host bus 190 is loaded in parallel into the loading register 510. The data is then shifted out serially from the loading register 510 into the least significant subfield module 520. The EC control unit 123 controls which bit position is selected by the multiplexers 540. Multiplexer selection control data is stored in the ROM of the EC control unit 123 to control the multiplexers based on a desired subfield processing size. The table below illustrates selection control of the multiplexers from a subfield register having a plurality of bit positions $b_0$ through $b_{Smax-1}$, where $b_0$ is the least significant bit (LSB) and $b_{Smax-1}$ is the most significant bit (MSB), and where $S_{max}=6$ and $S_{min=3}$.

| Subfield Processing Size Selected | Bit Position of Multiplexer Position of Subfield Register | Corresponding Bit Selected |
|---|---|---|
| 3 | $b_0$ | $b_2$ |
| 4 | $b_1$ | $b_3$ |
| 5 | $b_2$ | $b_4$ |
| 6 | $b_3$ | $b_5$ |

The content of the bit position selected by the multiplexer 540 is coupled to the least significant bit position of the subfield register in the next most significant subfield module. This process continues until all of the bits of the host bus 190 which are loaded into the loading register 510 are shifted out. Consequently, a write operation or read operation for one host bus word will take N clock cycles.

When data from the I/O register is to be read out onto the host bus 190, the process is performed in the reverse. The content of the I/O register 125 is loaded in parallel into the subfield registers 530. The EC control unit 123 then shifts the content of the subfield registers 530 to the left and through the fix-up module 570, which ultimately loads the data into the loading register 510 in the proper bit pattern for use by the host device. The multiplexer 570 of the fix-up module 550 selects the bit from the bit position according to the parameters set forth in the table above. The output of the multiplexer 570 thus supplies the bits serially to the loading register 510 until it is filled, and then the content of the loading register 510 can be read in parallel onto the host bus 190. The loading register 510 will be filled with a new host bus word every N clock cycles, and eventually, the I/O register will be completely read.

Figure 10:
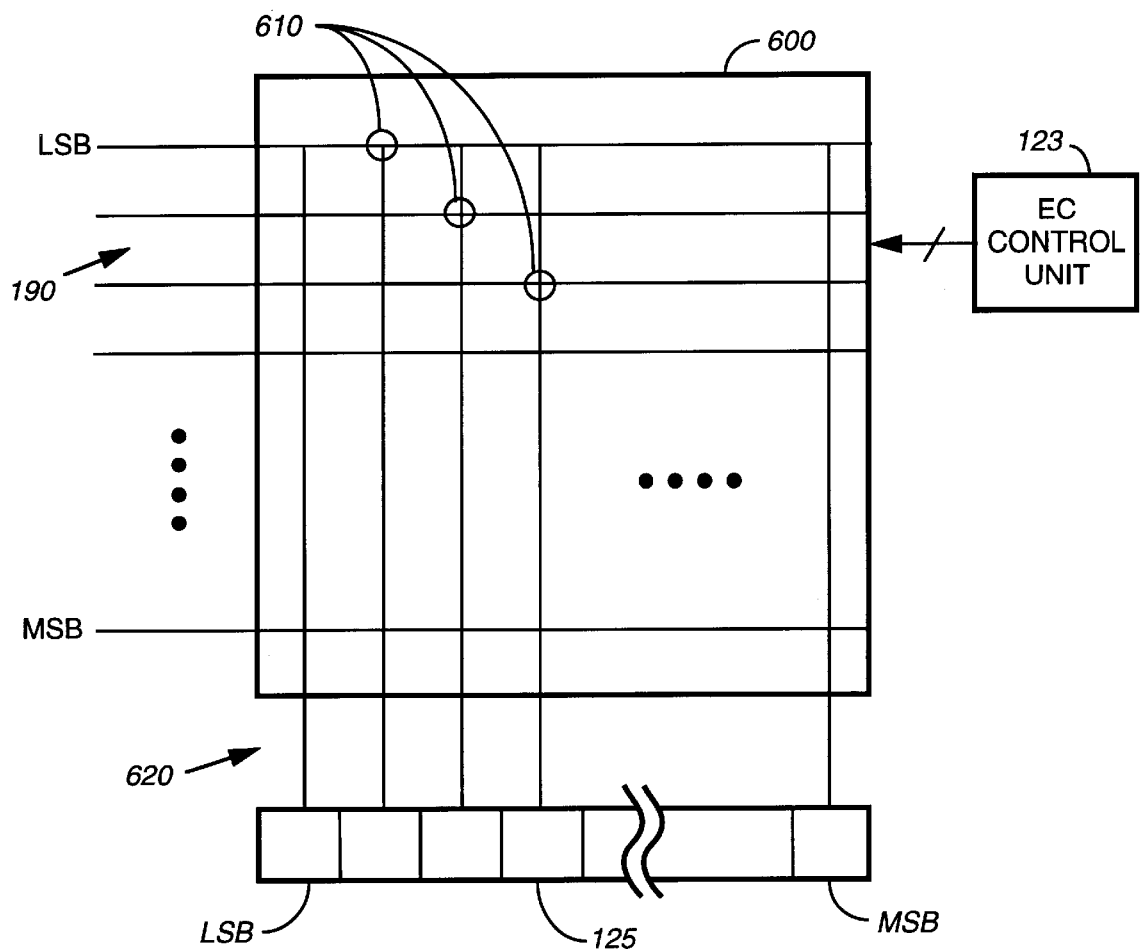
FIG. 10 is a block diagram of cross bar switch system according to a fourth embodiment of the present invention.

FIG. 10 illustrates a cross bar switch 600 according to a fourth embodiment of the present invention. The cross bar switch 600 comprises an array of switches shown at 610 provided such that a switch 610 is coupled between each bit position of the host bus 190 and each bit position of the I/O register 125. Specifically, each switch 610 is connected to a line of a switch bus 620 that connects with a bit position of the I/O register. Thus, any bit from the host bus 190 can be connected to any bit position of the I/O register 125. Each switch 610 is a transistor, for example, that is controlled by the EC control unit 123. The EC control unit 123 stores switch control data used to generate switch control signals for coupling bit positions of the host bus 190 to appropriate bit positions in the I/O register 125 in order to efficiently spread unused bits throughout the I/O register 125. The array of switches 610 is controlled to despreading information when read onto the host bus 190 from the I/O register 125.

Figure 2:
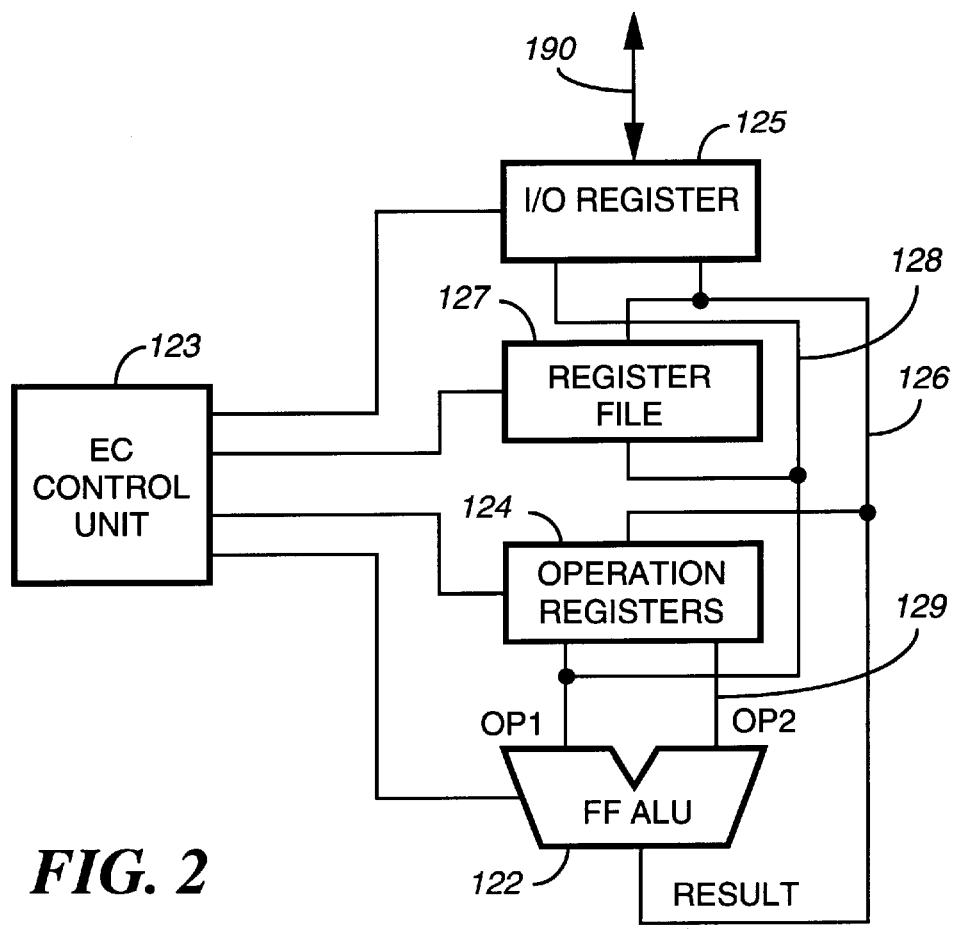
FIG. 2 is a block diagram of an elliptic curve processor according to the present invention.
Figure 11:
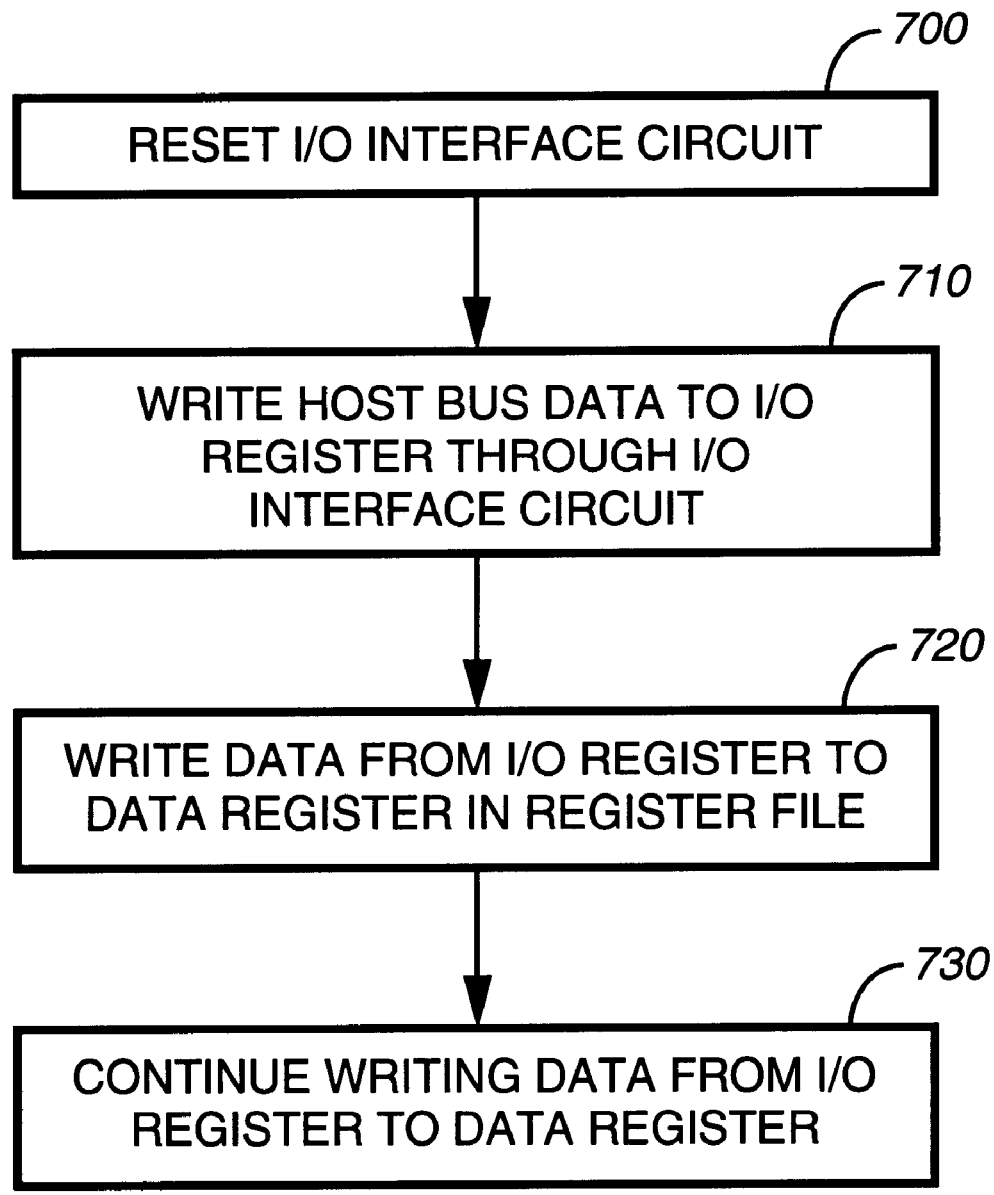
FIG. 11 is a flow chart illustrating the steps for exchanging data between the host bus and a data register of an elliptic curve processing circuit, according to the present invention.

Turning to FIG. 11 in conjunction with FIG. 2, the steps for writing data from the host bus 190 to the EC processor 120 are shown. In step 700, before writing begins, the EC control unit 123 issues a command to reset the I/O interface circuit (anyone of the foregoing circuits) so as to clear all information previously in the I/O interface circuit. Next, in step 710, the EC control unit 123 issues a command to cause the host bus data to be written to the I/O interface circuit and then through to the I/O register 125 of the EC processor 120. In step 720, the EC control unit 123 issues a command to write data from the 110 register 125 to a data register in the register file 127. The EC control unit in step 730 issues a command to continue writing data from the 110 register to the data register in the register file 127, until all data from the I/O register 125 has been read. The process for reading data from the I/O register 125 to the host bus is similar, but in steps 710 through 720, data is conveyed from the data register to the I/O register 125 and then from the I/O register 125 to the host bus through the I/O interface circuit.

The above description is intended by way of example only and is not intended to limited the present invention in any way except as set forth in the following claims.

What is claimed is:

1. A system for controlling an exchange of data between a host bus of a host device and an input/output register of a processing circuit which operates on a plurality of bits organized into subfields of variable size, each subfield comprising a smaller plurality of bits, the system comprising:

an interface circuit for connection between the host bus and the input/output register, the interface circuit spreading data when writing data from the host bus into the input/output register, and despreading data when reading data from the input/output register to the host bus; and a control unit connected to the interface circuit for controlling the interface circuit according to a spreading/despreading pattern based on a subfield processing size of the processing circuit, wherein the control unit controls the interface circuit to spread bits of a host bus word from the host bus to bit positions of the input/output register such that bit positions of the input/output register corresponding to a subfield contain as many bits of a host bus word as the subfield processing size of the processing circuit and wherein the control unit controls the interface circuit to despread bits of the input/output register when reading data from the input/output register to the host bus to reconstruct host bus words from bits in the input/output register according the subfield processing size of the processor circuit.

2. A system for controlling an exchange of data between a host bus of a host device and an input/output register of a processing circuit which operates on a plurality of bits organized into subfields of variable size, each subfield comprising a smaller plurality of bits, the system comprising:

an interface circuit for connection between the host bus and the input/output register, the interface circuit spreading data when writing data from the host bus into the input/output register, and despreading data when reading data from the input/output register to the host bus, wherein the interface circuit comprises a plurality of spreading circuits spanning bit positions of the input/output register, each spreading circuit spreading data from the host bus to a predetermined number of bit positions of the input/output registers, and a plurality of despreading circuits spanning bit positions of the input/output register, each despreading circuit despreading data from said predetermined number of bit positions of the input/output register to the host bus, and wherein the control unit is connected to the plurality of spreading circuits to control each spreading circuit according to a spreading pattern to write host bus words to bit positions of the input/output register, and connected to the plurality of despreading circuits to control each despreading circuit according to a despreading pattern to read data from bit positions of the input/output register and reconstruct host bus words read onto the host bus; and a control unit connected to the interface circuit for controlling the interface circuit according to a spreading/despreading pattern based on a subfield processing size of the processing circuit.

3. The system of claim 2, wherein the predetermined number of bit positions is equal to a product of a maximum subfield processing size of the processor circuit and a width of the host bus, wherein each spreading circuit comprises a plurality of multiplexers, each multiplexer having a plurality of inputs connected to select bit positions of the host bus and an output connected to a bit position of the input/output register; each despreading circuit comprising a plurality of multiplexers equal in number to the width of the host bus, each multiplexer of each despreading circuit having a plurality of inputs connected to select bit positions of the input/output register and an output connected to a bit position of the host bus;

wherein the control unit controls the multiplexers in the spreading circuit to select for output to a bit position of the input/output register content from a bit position of the host bus based on a subfield processing size of the processor circuit, and the control unit controls the multiplexers in the despreading circuit to select for output to a bit position of the host bus content from a bit position of the input/output register based on a subfield processing size of the processor circuit.

4. The system of claim 3, wherein the plurality of inputs of the multiplexers of each spreading circuit are connected to certain bit positions of the host bus based on the width of the host bus and a range of subfield size processing capability of the processor circuit, and the plurality of inputs of the multiplexers of each despreading circuit are connected to certain bit positions of the input/output register based on the width of the host bus and a range of subfield size processing capability of the processor circuit.

5. The system of claim 3, wherein the control unit stores spread control information in the form of multiplexer selection information for controlling which bit positions of the host bus are selected for connection to bit positions of the input/output register by each spreading circuit, the multiplexer selection information designating bit position connections for each subfield processing size of the processing circuit.

6. The system of claim 3, wherein the control unit stores despread control information in the form of multiplexer selection information for controlling which bit positions of the input/output register are selected for connection to bit positions of the host bus by each despreading circuit, the multiplexer selection information designating bit position connections for each subfield processing size of the processing circuit.

7. The system of claim 2, wherein the control unit controls each spreading circuit to spread multiple host bus words through the predetermined number of bit positions of the input/output register corresponding to multiple subfields, and controls each despreading circuit to despread bits from the predetermined number of bit positions of the input/output register and reconstruct host bus words read onto the host bus.

8. A system for controlling an exchange of data between a host bus of a host device and an input/output register of a processing circuit which operates on a plurality of bits organized into subfields of variable size, each subfield comprising a smaller plurality of bits, the system comprising:

an interface circuit for connection between the host bus and the input/output register, the interface circuit spreading data when writing data from the host bus into the input/output register, and despreading data when reading data from the input/output register to the host bus, wherein the interface circuit comprises an intermediate register for connection to the input/output register, the intermediate register comprising a predetermined number of bit positions substantially equal to a product of a width of the host bus and a maximum subfield processing size of the processing circuit, a spreading circuit coupled to the host bus and to the intermediate register, the spreading circuit spreading data from the host bus into the intermediate register, a despreading circuit coupled to the intermediate register and to the host bus, the despreading circuit despreading data from the intermediate register onto the host bus, and wherein the control unit is connected to the spreading circuit, despreading circuit and the intermediate register to control exchange of data between the host bus and the input/output register; and a control unit connected to the interface circuit for controlling the interface circuit according to a spreading/despreading pattern based on a subfield processing size of the processing circuit.

9. The system of claim 8, wherein the control unit controls writing of host bus words from the host bus through the spreading circuit to bit positions of the intermediate register until the intermediate register is spanned, and then controls the intermediate register to write its content to a first portion of the input/output register, and controls writing of additional host bus words from the host bus through the spreading circuit to the intermediate register, and then controls the intermediate register to writes its content to a more significant portion of the input/output register.

10. The system of claim 8, wherein the spreading circuit comprises a plurality of multiplexers, each multiplexer having a plurality of inputs connected to select bit positions of the host bus and an output connected to a bit position of the intermediate register, and the despreading circuit comprising a plurality of multiplexers equal in number to the width of the host bus, each multiplexer of the despreading circuit having a plurality of inputs connected to select bit positions of the intermediate register and an output connected to a bit position of the host bus;

wherein the control unit controls the multiplexers in the spreading circuit to select for output to a bit position of the intermediate register content from a bit position of the host bus based on a subfield processing size of the processor, and controls the multiplexers in the despreading circuit to select for output to a bit position of the host bus content from a bit position of the input/output register based on a subfield processing size of the processor circuit.

11. A system for controlling an exchange of data between a host bus of a host device and an input/output register of a processing circuit which operates on a plurality of bits organized into subfields of variable size, each subfield comprising a smaller plurality of bits, the system comprising:

an interface circuit for connection between the host bus and the input/output register, the interface circuit spreading data when writing data from the host bus into the input/output register, and despreading data when reading data from the input/output register to the host bus, the interface circuit comprising a loading register having a width equal to a width of a host bus, a plurality of subfield modules spanning the input/output register, each subfield module comprising a subfield register having a width equal to a maximum subfield processing size of the processing circuit, and a multiplexer having a plurality of inputs connected to select bit positions of the subfield register and an output connected to a subfield register in a next most significant subfield module, a least significant subfield module being connected to the loading register to receive data shifted serially out of the loading register, each subfield register being capable of receiving data shifted in serially and outputting data in parallel to bit positions of the input/output register, and receiving data in parallel from bit positions of the input/output register, and wherein the control unit is connected to each multiplexer in each subfield module, the control unit controlling writing of host bus words from the host bus to the input/output register by shifting a plurality of bits representing the host bus word from the loading register through the subfield modules and controlling which of the inputs of each multiplexer is selected for output for connection to a subfield register in a next significant subfield module, wherein each subfield register outputs bits to bit positions of the input/output register; and a control unit connected to the interface circuit for controlling the interface circuit according to a spreading/despreading pattern based on a subfield processing size of the processing circuit.

12. The system of claim 11, wherein the interface circuit further comprises a fix-up module comprising:

a fix-up register connected to an output of a multiplexer in a most significant subfield module; and a multiplexer having a plurality of inputs connected to select bit positions of the fix-up register and an output connected to a least significant bit position of the loading register, the control unit controlling the loading register read data in parallel onto the host bus once the loaded register is full.

13. The system of claim 11, wherein the plurality of inputs of each multiplexer connects to select bit positions of the associated subfield register based on the maximum subfield processing size and a minimum subfield processing size of the processing circuit.

14. The system of claim 13, wherein the control unit controls each multiplexer to select for output content of a bit position of an associated subfield register based on the subfield processing size of the processing circuit.

15. The system of claim 1, wherein the interface circuit comprises a cross bar switch suitable for connection to the host bus and to the input/output register, the cross bar switch comprising an array of switches connected to each bit position of the host bus and to each bit position of the input/output register in order to selectively connect any bit position of the host bus to any bit position of the input/output register; and wherein the control unit is connected to the cross bar switch and controls the array of switches to connect bit positions of the host bus to appropriate bit positions of the input/output register according to the spreading/despreading pattern.

16. The system of claim 1, wherein the processing circuit is an elliptic curve processing circuit and the control unit is an elliptic curve control unit which controls operations of the elliptic curve processing circuit.

17. An elliptic curve processing circuit comprising the system of claim 1.

18. A communication device comprising the elliptic curve processing circuit of claim 17.

19. The communication device of claim 18, and further comprising:

a receiver for receiving RF signals;

a controller coupled to the receiver; and the controller being coupled to the elliptic curve processing circuit to supply elliptic curve point information embedded in the RF signals for processing by the elliptic curve processing circuit.

20. A selective call receiver comprising:

a receiver for receiving RF signals;

a controller coupled to the receiver;

a decoder coupled to the receiver and to the controller, the decoder decoding information in the RF signals; and an elliptic curve processing circuit coupled to the controller and exchanging data with the controller including elliptic curve point information embedded in the RF signals, the elliptic curve processor operating on a plurality of bits organized into subfields of variable size, each subfield comprising a smaller plurality of bits, the elliptic curve processing circuit comprising:

an input/output register for receiving data to be processed by the elliptic curve processing circuit and to output data processed by the elliptic curve processing circuit;

an interface circuit for connection between the host bus and the input/output register, the interface circuit spreading data from the host bus into the input/output register, and despreading data from the input/output register to the host bus; and a control unit connected to the interface circuit for controlling exchange of data between the input/output register and the host bus according to a spreading/despreading pattern based on a subfield processing size of the processing circuit, wherein the control unit controls the interface circuit to spread bits of a host bus word from the host bus to bit positions of the input/output register such that bit positions of the input/output register corresponding to a subfield contain as many bits of a host bus word as the subfield processing size of the processing circuit, and wherein the control unit controls the interface circuit to despread bits of the input/output register when reading data from the input/output register to the host bus to reconstruct host bus words from bits in the input/output register according the subfield processing size of the processor circuit.

21. An elliptic curve processing circuit for processing a plurality of bits organized into subfields of variable size, each subfield comprising a smaller plurality of bits, the elliptic curve processing circuit comprising:

an input/output register which communicates with a host bus of a host device;

an interface circuit for connection between the host bus and the input/output register, the interface circuit spreading data from the host bus into the input/output register, and despreading the data from the input/output register to the host bus; and a control unit connected to the interface circuit for controlling exchange of data between the input/output register and the host bus according to a spreading/despreading pattern based on a subfield processing size of the processing circuit;

wherein the control unit controls the interface circuit to spread bits of a host bus word from the host bus to bit positions of the input/output register such that bit positions of the input/output register corresponding to a subfield contain as many bits of a host bus word as the subfield processing size of the processing circuit, and wherein the control unit controls the interface circuit to despread bits of the input/output register when reading data from the input/output register to the host bus to reconstruct host bus words from bits in the input/output register according the subfield processing size of the processor circuit.

* * * * *